United States Patent
Rachabathuni et al.

(10) Patent No.: US 9,679,047 B1
(45) Date of Patent: Jun. 13, 2017

(54) CONTEXT-SENSITIVE REFERENCE WORKS

(75) Inventors: Sailesh Rachabathuni, Santa Clara, CA (US); Kenneth P. Kiraly, Menlo Park, CA (US)

(73) Assignee: Amazon Technologies, Inc., Seattle, WA (US)

( * ) Notice: Subject to any disclaimer, the term of this patent is extended or adjusted under 35 U.S.C. 154(b) by 685 days.

(21) Appl. No.: 12/749,073

(22) Filed: Mar. 29, 2010

(51) Int. Cl.
G06F 17/30 (2006.01)

(52) U.S. Cl.
CPC .............. G06F 17/30705 (2013.01)

(58) Field of Classification Search
USPC .......................................................... 707/603
See application file for complete search history.

(56) References Cited

U.S. PATENT DOCUMENTS

| | | | |
|---|---|---|---|
| 5,416,896 A * | 5/1995 | Motoyama | 715/236 |
| 5,483,629 A * | 1/1996 | Motoyama et al. | 715/236 |
| 5,745,776 A * | 4/1998 | Sheppard, II | 715/202 |
| 6,120,297 A | 9/2000 | Morse, III et al. | |
| 6,154,757 A | 11/2000 | Krause et al. | |
| 6,331,867 B1 | 12/2001 | Eberhard et al. | |
| 6,419,496 B1 | 7/2002 | Vaughan, Jr. | |
| 6,438,579 B1 | 8/2002 | Hosken | |
| 6,728,752 B1 | 4/2004 | Chen et al. | |
| 6,961,722 B1 | 11/2005 | Bruecken | |
| 7,814,112 B2 | 10/2010 | Gupta et al. | |
| 7,849,393 B1 | 12/2010 | Hendricks et al. | |
| 7,966,334 B1 | 6/2011 | Bezos et al. | |
| 8,099,660 B1 | 1/2012 | O'Sullivan et al. | |
| 8,118,224 B2 | 2/2012 | Barsness et al. | |
| 8,250,071 B1 | 8/2012 | Killalea et al. | |
| 8,286,885 B1 | 10/2012 | Zehr et al. | |
| 2002/0082939 A1 | 6/2002 | Clark et al. | |
| 2002/0120651 A1 | 8/2002 | Pustejovsky et al. | |
| 2003/0028564 A1 | 2/2003 | Sanfilippo | |
| 2003/0160830 A1 | 8/2003 | DeGross | |
| 2004/0064369 A1* | 4/2004 | Kato | 705/14 |
| 2004/0201633 A1 | 10/2004 | Barsness et al. | |
| 2004/0248653 A1 | 12/2004 | Barros et al. | |
| 2005/0010589 A1 | 1/2005 | Novak et al. | |
| 2005/0060266 A1 | 3/2005 | DeMello et al. | |
| 2005/0069849 A1 | 3/2005 | McKinney et al. | |

(Continued)

OTHER PUBLICATIONS

Haupt, "Fun and Functional. Interesting new consumer-technology products", Horizon Air Magazine, Mar. 2010, 8 pages.

(Continued)

*Primary Examiner* — Joshua Bullock
(74) *Attorney, Agent, or Firm* — Lee & Hayes, PLLC

(57) ABSTRACT

An architecture and techniques for outputting requested information from reference works (e.g., dictionaries, thesauruses, almanacs, atlases, encyclopedias, gazetteers) in a context-sensitive manner. For instance, when a user reads an electronic book (eBook) and requests a definition for a word found within the eBook, the techniques may display a definition for the word that has been selected based on the context of the request. In one example, the techniques may display a definition that corresponds to an identified genre of the eBook in which the word appears. In another example, the techniques may display a definition that corresponds to known information about the user, such as a preference of the user or the like.

23 Claims, 7 Drawing Sheets

(56) References Cited

U.S. PATENT DOCUMENTS

| | | |
|---|---|---|
| 2005/0193330 A1 | 9/2005 | Peters |
| 2006/0041538 A1 | 2/2006 | King et al. |
| 2006/0101012 A1 | 5/2006 | Carson et al. |
| 2006/0230340 A1 | 10/2006 | Parsons et al. |
| 2006/0277046 A1 | 12/2006 | Lachish et al. |
| 2006/0282778 A1 | 12/2006 | Barsness et al. |
| 2007/0011160 A1* | 1/2007 | Ferland et al. ............... 707/6 |
| 2007/0136231 A1* | 6/2007 | Padmanabhan ............... 707/2 |
| 2007/0265834 A1* | 11/2007 | Melnick ............... 704/10 |
| 2007/0269775 A1 | 11/2007 | Andreev et al. |
| 2008/0082930 A1 | 4/2008 | Omernick et al. |
| 2008/0141182 A1 | 6/2008 | Barsness et al. |
| 2008/0222552 A1 | 9/2008 | Batarseh et al. |
| 2009/0144051 A1 | 6/2009 | Lee et al. |
| 2009/0150217 A1 | 6/2009 | Luff |
| 2009/0246744 A1 | 10/2009 | Lofthus et al. |
| 2010/0003659 A1 | 1/2010 | Edmonds |
| 2010/0005087 A1* | 1/2010 | Basco et al. ............... 707/5 |
| 2010/0020030 A1 | 1/2010 | Kim et al. |
| 2010/0021871 A1 | 1/2010 | Layng et al. |
| 2010/0128994 A1* | 5/2010 | Zwolinski ............... 382/229 |
| 2010/0153440 A1* | 6/2010 | Hubert ............... 707/769 |
| 2010/0245282 A1 | 9/2010 | Lai |
| 2010/0273138 A1 | 10/2010 | Edmonds et al. |
| 2010/0311030 A1 | 12/2010 | He et al. |
| 2011/0018695 A1 | 1/2011 | Bells et al. |
| 2011/0076654 A1 | 3/2011 | Green et al. |
| 2011/0087955 A1 | 4/2011 | Ho et al. |
| 2011/0123967 A1 | 5/2011 | Perronnin et al. |
| 2011/0161073 A1* | 6/2011 | Lesher et al. ............... 704/10 |
| 2011/0167350 A1 | 7/2011 | Hoellwarth |
| 2011/0261030 A1 | 10/2011 | Bullock |
| 2012/0005617 A1 | 1/2012 | Lee et al. |
| 2012/0211438 A1 | 8/2012 | Glover |
| 2012/0221972 A1 | 8/2012 | Patterson et al. |
| 2012/0240081 A1 | 9/2012 | Sim et al. |
| 2012/0240085 A1 | 9/2012 | Sim et al. |

OTHER PUBLICATIONS

"Babylon 8 Translation Softwar and Dictionary Tool" retrieved on May 7, 2010 at <<http://www.babylon.com/>>, entire website, Babylon, 2 pages.

Office action for U.S. Appl. No. 12/823,085, mailed on Feb. 1, 2013, Keller et al., "Refining Search Results Based on Touch Gestures", 17 pages.

Non-Final Office Action for U.S. Appl. No. 13/042,185, mailed on Feb. 22, 2013, Sailesh Rachabathuni et al., "Dynamically Selecting Example Passages", 17 pages.

Office action for U.S. Appl. No. 12/823,077, mailed on Oct. 9, 2012, Freed, "Surfacing Reference Work Entries on Touch-Sensitive Displays", 12 pages.

Office action for U.S. Appl. No. 12/823,086, mailed on Jun. 26, 2013, Keller, "Surfacing Instances of a Selected Content Portion", 15 pages.

Office action for U.S. Appl. No. 13/042,185, mailed on Jul. 18, 2013, Rachabathuni, "Dynamically Selecting Example Passages", 23 pages.

Office action for U.S. Appl. No. 12/823,086, mailed on Oct. 24, 2014, Kevin E. Keller, "Surfacing Instancexs of a Selected Content Portion", 16 pages.

Final Office Action for U.S. Appl. No. 12/730,187, mailed on Nov. 22, 2013, Oleksandr Y. Berezhnyy, "Vocabulary Builder", 16 pages.

Office Action for U.S. Appl. No. 12/823,086, mailed on Jan. 22, 2015, Kevin E. Keller, "Surfacing Instances of a Selected Content Portion", 17pages.

Office Action for U.S. Appl. No. 13/042,185.

Office Action for U.S. Appl. No. 13/927,456, mailed on Nov. 20, 2013, Ian W. Freed, "Providing Reference Work Entries on Touch-Sensitive Displays", 12 pages.

Office action for U.S. Appl. No. 12/729,913, mailed on Nov. 23, 2012, Berezhnyy et al., "Vocabulary Building of Words Identified During eBook Consumption", 19 pages.

Office Action for U.S. Appl. No. 13/042,185, mailed on Nov. 27, 2013, Sailesh Rachabathuni, "Dynamically Selecting Example Passages", 20 pages.

Final Office Action for U.S. Appl. No. 12/729,913, mailed on Nov. 28, 2014, Oleksandr Y. Berezhnyy, Vocabulary Building of Words Identified During eBook Consumption, 25 pages.

Office action for U.S. Appl. No. 12/823,086, mailed on Nov. 30, 2015, Keller, "Surfacing Instances of a Selected Content Portion", 18 pages.

Office action for U.S. Appl. No. 12/729,913, mailed on Dec. 18, 2015, Berezhnyy et al., "Vocabulary Building of Words Identified During eBook Consumption", 31 pages.

Office action for U.S. Appl. No. 12/730,187 mailed on Mar. 26, 2013, Beezhnyy et al., "Vocabulary Builder", 17 pages.

Final Office Action for U.S. Appl. No. 12/823,086, mailed on Mar. 7, 2014, Kevin E. Keller, "Surfacing Instances of a Selected Content Portion", 12 pages.

Office Action for U.S. Appl. No. 13/553,172 mailed on Apr. 10, 2014, Tom Killalea, "Disambiguation of Term Meaning", 15 pages.

Office action for U.S. Appl. No. 12/730,187, mailed on Apr. 26, 2016, Berezhnyy et al., "Vocabulary Builder", 23 pages.

Office action for U.S. Appl. No. 12/729,913, mailed on Apr. 28, 2014, Berezhnyy et al., "Vocabulary Building of Words Identified During eBook Consumption", 22 pages.

Final Office Action for U.S. Appl. No. 13/042,185, mailed on Apr. 8, 2014, Sailesh Rachabathuni, "Dynamically Selecting Example Passages", 21 pages.

Office Action for U.S. Appl. No. 12/823,086, mailed on Jun. 2, 2014, Kevin E. Keller, "Surfacing Instances of a Selected Content Portion", 15 pages.

Final Office Action for U.S. Appl. No. 13/042,185, mailed on Jul. 13, 2015, Sailesh Rachabathuni, "Dynamically Selecting Example Passages", 22 pages.

Non-Final Office Action for U.S. Appl. No. 12/729,913, mailed on Jul. 30, 2012, Oleksandr Y. Berezhnyy et al., "Vocabulary Building of Words Identified During eBook Consumption", 18 pages.

Final Office Action for U.S. Appl. No. 12/823,086, mailed on Jul. 8, 2015, Kevin E. Keller, "Surfacing Instances of a Selected Content Portion", 16 pages.

Office Action for U.S. Appl. No. 12/729,913, mailed on Aug. 15, 2014, Oleksandr Y. Berezhnyy, "Vocabulary Building of Words Identified During eBook Consumption", 31 pages.

Office action for U.S. Appl. No. 12/823,086, mailed on Aug. 9, 2016, Keller, "Surfacing Instances of a Selected Content Portion", # pages.

Office action for U.S. Appl. No. 12/823,086, mailed on Apr. 14, 2016, Keller, "Surfacing Instances of a Selected Content Portion", 17 pages.

Websters, "Third New International Dictonary of the English Language", G.C. Merriam Company, Springfield Massachusetts, 1965, 2 pages.

* cited by examiner

CONTEXT-SENSITIVE REFERENCE WORKS

BACKGROUND

A large and growing population of users is enjoying entertainment through the consumption of digital content items (or simply "content items"), such as music, movies, images, electronic books, and so on. The users employ various electronic devices to consume such content items. Among these electronic devices are electronic book (eBook) reader devices, cellular telephones, personal digital assistants (PDAs), portable media players, tablet computers, netbooks, and the like. As the quantity of available electronic media content continues to grow, along with increasing proliferation of devices to consume that media content, finding ways to enhance user experience continues to be a priority.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 1 illustrates an architecture in which a community of users operates respective client devices to consume content items, such electronic books (eBooks), songs, videos and the like. In this architecture, the client devices and/or a content item service implement techniques to provide context-sensitive reference works (e.g., dictionaries, thesauruses, atlases, etc.) that provide requested information to the users based on a genre of the content item associated with the request, a characteristic of the user, or the like.

DETAILED DESCRIPTION

Figure 1:
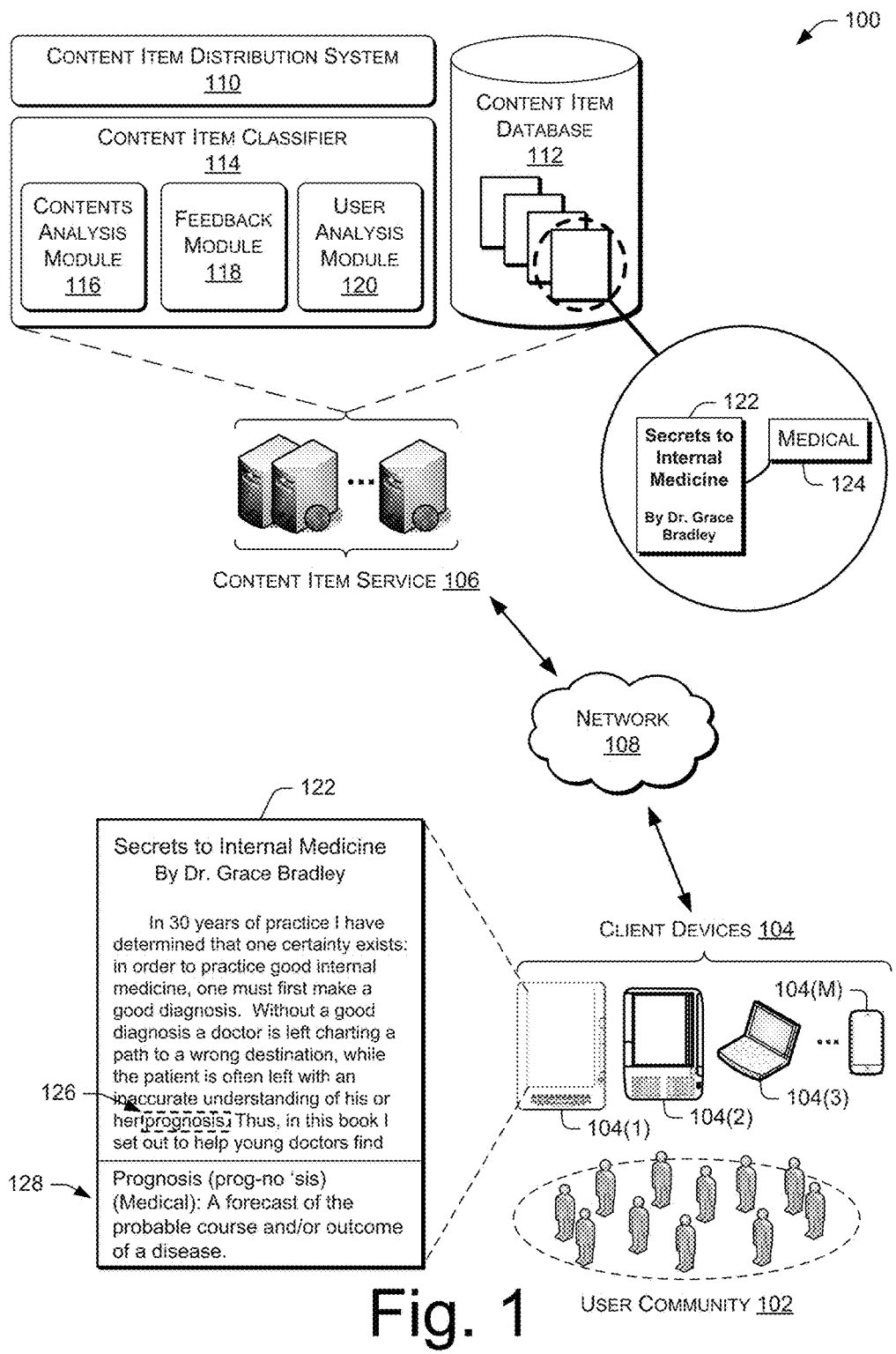

This disclosure describes an architecture and techniques for outputting requested information from reference works (e.g., dictionaries, thesauruses, almanacs, atlases, encyclopedias, gazetteers) in a context-sensitive manner. For instance, when a user reads an electronic book (eBook) and requests a definition for a word found within the eBook, the techniques may display a definition for the word that has been selected based on the context of the request. In one example, the techniques may display a definition that corresponds to one or more identified genres of the eBook in which the word appears. In another example, the techniques may display a definition that corresponds to known information about the user, such as a preference of the user or the like.

For instance, if a user currently reading a medical-related eBook requests to receive a definition of a word from the eBook, the techniques will display a medical-related definition of the word. If the user reads a science-fiction (sci-fi) eBook, meanwhile, the techniques may display a sci-fi or science-related definition of the word. In each of these instances, the techniques may display more than one definition, with the order of the displayed definitions being based on the classification of the eBook. For instance, the medical definition may be displayed first in instances where the eBook is determined be medical-related. As such, the techniques display information from a reference work, such as the dictionary, in a manner that is more likely to be relevant and of interest to the user.

While the discussion below describes these techniques in the context of eBooks rendered on eBook reader devices, these techniques may apply to a variety of different types of content items, such as songs, videos, still images, and so on. Furthermore, the techniques may apply to a variety of different electronic devices, such as personal computers, cellular telephones, personal digital assistants (PDAs), portable media players, tablet computers, netbooks, and the like.

In each instance, the techniques may classify a particular content item as being associated with one or more particular genres (e.g., science, science fiction, medicine, business, law, fiction, a particular foreign language, etc.). Before or after the classification, a user experiencing the content item may request some information regarding the content item that may be found within a reference work. For instance, the user may request a definition of a word, synonyms or antonyms for a word, information from an encyclopedia regarding an identified word, phrase, or topic, a map for or directions to an identified location, or the like. In response to receiving this request, the techniques select an entry from the appropriate type of reference work and then output (e.g., visually, audibly, etc.) the reference work entry.

For instance, if a user requests information about a particular topic from within the content item, the techniques may select the corresponding encyclopedia entry based on the genre of the content item. For instance, if the user currently experiences a sports-themed content item and the user requests information regarding the topic "bat," the techniques may output information regarding "bats" from a sports-themed encyclopedia. This information will likely discuss a round, elongated object for hitting a ball. If, however, the user currently experiences an animal-related content item and the user makes the same request, the techniques may output an encyclopedia entry from an animal-related encyclopedia. This information will likely discuss the nocturnal mammal.

While the above example describes referencing discrete reference works (here, encyclopedias), the techniques may instead reference a single reference work that includes multiple different types of entries (e.g., sports-related, animal-related, medical, etc.). For instance, a single encyclopedia may include an entry for "bat" in the sports sense and an entry for "bat" in the animal sense. Here, the techniques may display one or both of the definitions in a manner based on the identified genre of the content item.

The discussion begins with a section entitled "Example Architecture" that describes one example architecture and several example components that implement the techniques introduced above. Next, a section entitled "Example eBook Reader Device" follows, and describes example components of one type of device that may implement context-sensitive reference works. A section entitled "Example User Interfaces" follows, describing examples of user interfaces (UIs) that may be served to and rendered at the client devices of FIG. 1. The discussion then moves on to illustrate and describe an "Example Process" for implementing the described techniques, before ending with a brief conclusion.

This brief introduction, including section titles and corresponding summaries, is provided for the reader's convenience and is not intended to limit the scope of the claims, nor the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

Architectural Environment

FIG. 1 illustrates an example architecture 100 in which a community of users 102 operates respective client devices 104(1), 104(2), 104(3), . . . , 104(M) to consume content items, such electronic books (eBooks), songs, videos, still images and the like. In this architecture, the client devices 104 and/or a content item service 106 implement techniques to provide context-sensitive reference works (e.g., dictionaries, thesauruses, atlases, etc.) that provide requested information to the users based on a genre of the content item associated with the request, a characteristic of the requesting user, or the like.

The client devices 104 are variously configured with different functionality to enable consumption of one or more types of contents items of any type or format including, for example, electronic texts (e.g., documents of any format, electronic periodicals, such as digital magazines and newspapers, etc.), digital audio (e.g., music, audible books, etc.), digital video (e.g., movies, television, short clips, etc.), images (e.g., art, photographs, etc.), and multimedia content. The terms "electronic book" and/or "eBook", as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, etc.

FIG. 1 illustrates that the client devices 104 operated by users of the user community 102 may comprises eBook reader devices (e.g., devices 104(1) and 104(2)), laptop computers (e.g., device 104(3)), multifunction communication devices (e.g., device 104(M)), portable digital assistants (PDAs), wireless headsets, entertainment systems, portable media players, tablet computers, cameras, video cameras, netbooks, notebooks, desktop computers, gaming consoles, DVD players, media centers, or any other type of device.

In the architecture 100, the client devices may receive, over a network 108, one or more content items for presentation on the devices from the content item service 106. The network 108 is representative of any one or combination of multiple different types of networks, such as the Internet, cable networks, cellular networks, wireless networks, and wired networks. One example of a wireless technology and associated protocols is the Wireless Fidelity (WiFi) wireless networking technologies defined according to IEEE 802.11 standards, while another example is a cellular network.

As illustrated, the content item service 106 is embodied as one or more servers that collectively have processing and storage capabilities to receive requests for content items from the devices, such as the eBook reader device 104(1). The servers of the content item service 106 may be embodied in any number of ways, including as a single server, a cluster of servers, a server farm or data center, and so forth, although other server architectures (e.g., mainframe) may also be used. Alternatively, the content item service 106 may be embodied as a client device, such as desktop computer, a laptop computer, an eBook reader device and so forth. In some implementations, for instance, some or all of the elements of content item service 106 illustrated in FIG. 1 may reside on the client devices 104.

In the illustrated example, the content item service 106 includes a content item distribution system 110, a content item database 112, and a content item classifier 114. The content item distribution system 110 may support distribution of content items (e.g., online retailing via a website) to the client devices 104. In some implementations, the servers store the content items in the content item database 112, although in other implementations, the servers merely facilitate purchase and delivery of content items stored in other locations.

The content item classifier 114, meanwhile, serves to classify content items by, for example, genre. For instance, the classifier 114 may classify content items as relating to fiction, non-fiction, historical, science, science fiction, medicine, business, law, sports, animals, geography, computer science, engineering, chemistry, mathematics, a particular language or any other type of genre, category, or classification. To classify these content items, the classifier 114 may reference a prior categorization of the content items within, for example, the content item database 112. Or, the classifier may classify these content items in other ways, as discussed in detail below.

Furthermore, the content item classifier 114 may classify content items as relating to multiple different genres. For instance, an eBook that includes multiple sections may be associated with different genres corresponding to the different sections of the book. A textbook, for instance, may include a section classified as relating to mathematics, a section classified as relating to science, and a section classified as relating to medicine. A single section or an entire eBook may also be classified as relating to multiple genres.

As discussed in detail below, these genre classifications may be used to determine which category of reference work entry to use when receiving a request for information from a user. For instance, if a user reading the afore-mentioned textbook requests a definition for a word found within the science section of the book, the device of the user may display a science-related dictionary entry (alone or more prominently than other definitions).

The content item classifier 114 may classify content items in a multitude of ways. As illustrated, the content item classifier 114 includes a contents analysis module 116, a feedback module 118, and a user analysis module 120. The contents analysis module 116 may classify content items with reference to the actual contents of the item. Using an eBook as an example, this module 116 may scan the text of the eBook to identify key words and may then compare these identified key words to known, pre-compiled sets of key words associated with different genres. For example, the module 116 may scan contents of an eBook and may identify that the most-frequently used words of the eBook include "medicine," "doctor," "Dr.," "disease," and "hospital." As such, the module 116 may compare these key words to sets of key words associated with different genres before concluding that this book should be classified as being within the medical genre. Similarly, the module 116 may analyze images or sounds within a content item and may compare these images or sounds to known sets of images or sounds associated with identified genres.

In some instances, this module 116 may weight certain words more heavily than others. For instance, the module 116 may weight the words of the title more heavily than the words within the chapters of the book. Similarly, the module 116 may assign a larger weight to the name of the author, the identity of the publisher, and the like.

The feedback module 118, meanwhile, serves to classify content items in whole or in part based upon received feedback. For instance, these techniques may include querying human users as to the genre of a content item and using responses from the users as input in determining the genre(s) of the respective content item. Furthermore, this module 118 may also track user actions in order to receive this feedback. For instance, envision that a user requests a definition found within a particular eBook for the term "boil." Envision also that the classifier 114 has classified this eBook as relating to science and, as such, the user's device displays a science definition of the term boil, explaining that "boiling" refers to when a liquid changes state to a gas. However, feedback module 118 may determine (e.g., via an indication received over the network 108) that the user requested to see a different definition of the term "boil" (e.g., a medical definition). In this instance, the feedback module 118 may deduce that the eBook should have been classified as being of the "medical" genre rather than the "science" genre.

In some instances, the classifier 114 may assign a confidence level to a particular genre associated with a content item and may alter this genre based on feedback received at the feedback module 118. For instance, the classifier may determine that the eBook from this example above is 53% likely to be primarily of a "science" genre and 47% likely to be primarily of a "medical" genre. After receiving feedback similar to the feedback from the user discussed immediately above, these percentages may change such that the classifier 114 now judges that the eBook is more likely to relate to medicine than pure science. As such, the classifier 114 may change the assigned genre to "genre" (or may change the primary genre to "medical" while marking "science" as a secondary genre).

The user analysis module 120, meanwhile, may function to classify content items in whole or in part based upon the identity of the user experiencing the media item. For instance, when the content item distribution system 110 downloads an eBook to the eBook reader device 104(1), the module 120 may analyze known information about the user associated with the device by, for instance, referencing a user profile stored in an account of the user at the content item service 106. The module 120 may then use this known information about the user to help deduce the genre of the eBook.

For instance, envision that the user associated with the eBook reader device 104(1) often purchases eBooks, audio items, and the like that are classified as being of the "medical" genre. Therefore, when attempting to determine the genre of a new eBook purchased at the device 104(1), the module 120 may more heavily weight the chances of this eBook being related to medicine. The user analysis module 120 may similarly use any other known information about the user to help classify content items, including a location of the user, demographic information of the user, an address of the user, and the like.

With information from some or all of the modules 116, 118, and 120, the content item classifier 114 may classify content items as belonging to one or more genres. For instance, individual sections of content items (e.g., chapters, individual songs or tracks, etc.) may each be associated with one or more genres, or an entire content item may be associated with a single or multiple genres. In each instance, the determined genre(s) is helpful to determine the appropriate type of reference work entry to use when a user requests information regarding a word, phrase, or topic within the corresponding content item.

FIG. 1, for instance, illustrates that the eBook reader device 104(1) currently displays a fictitious eBook 122 entitled "Secrets to Internal Medicine" by a fictitious author "Dr. Grace Bradley," which the device 104(1) may have downloaded from the content item service 106. FIG. 1 also illustrates that the content item database 112 stores the same eBook 122. In addition, FIG. 1 illustrates that the content item classifier 114 has classified this eBook 122 as relating a particular genre 124. Here, the classifier 114 has determined that the eBook relates to medicine and has classified this book accordingly. The content item database 112 may similarly store multiple other content items along with a notation of the genre(s) of each of these other items.

In this example, the user of the eBook reader device 104(1) has selected (via a highlight 126) a particular word ("prognosis") from the eBook 122. In response, the eBook reader device 104(1) displays a definition 128 of the selected word. Here, the definition 128 of the word comes from a medical dictionary entry, which corresponds to the classification of the eBook 16 as being related to the "medical" genre. As such, this definition 128 states that a "prognosis" is "a forecast of the probable course and/or outcome of a disease." While this example describes a dictionary, other implementations may employ other types of reference works, a few examples of which are discussed below.

Example eBook Reader Device

Figure 2:
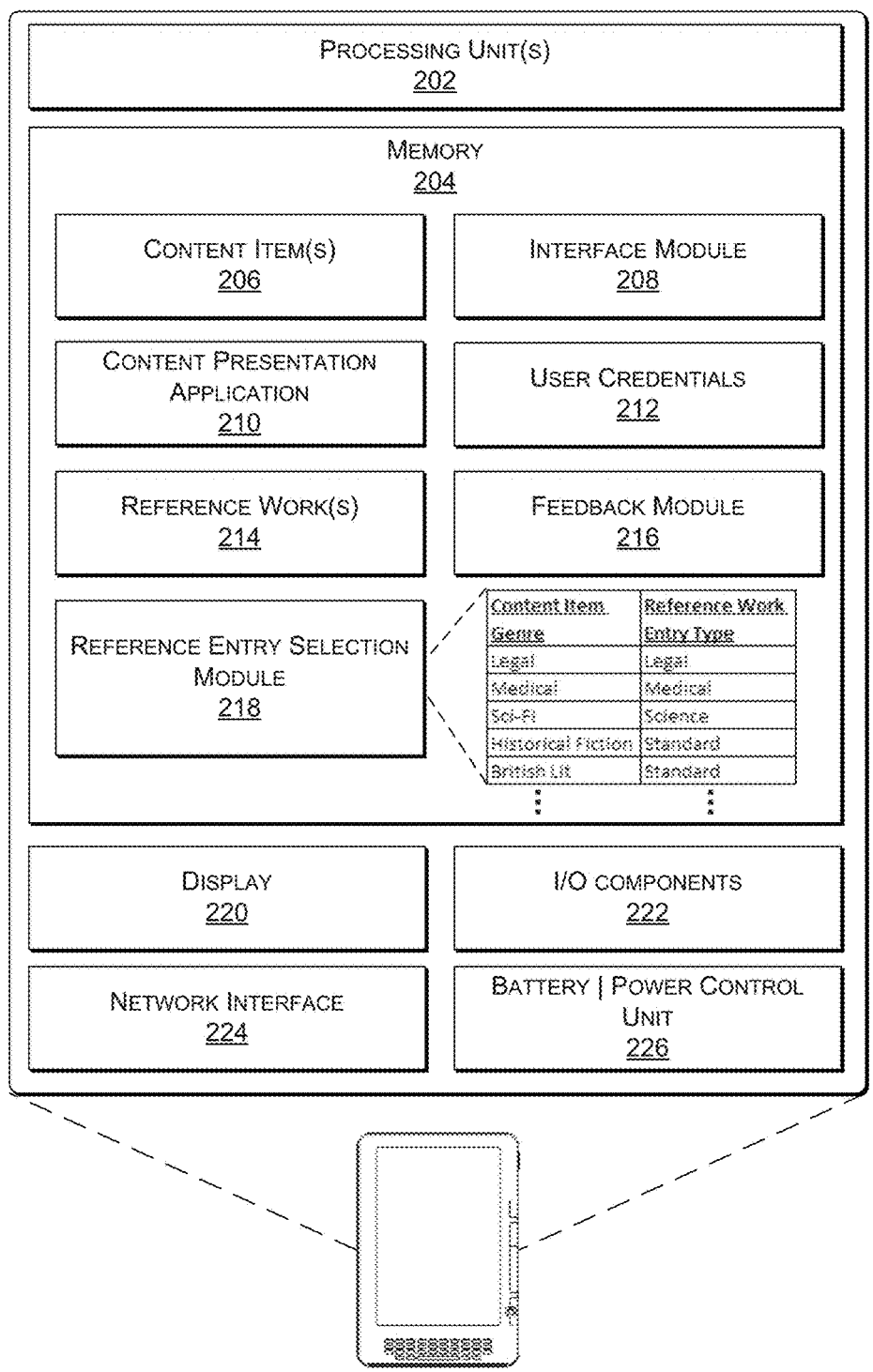
FIG. 2 is a block diagram of selected modules of an eBook reader device capable of receiving a request for information from a user experiencing a content item, determining a type of reference work entry appropriate for the content item or the user, and providing the information to the user from the determined type of reference work entry.

FIG. 2 illustrates example components that might be implemented in the eBook reader device 104(1) of FIG. 1 that displays information provided by context-sensitive reference works, such as dictionaries or the like. In this example, the eBook reader device 104(1) is a dedicated, handheld eBook reader device, although other electronic devices may implement these techniques and, hence, may include some of the functionality described herein.

In a very basic configuration, the eBook reader device 104(1) includes one or more processing units 202 and memory 204. Depending on the configuration of a dedicated eBook reader device 104(1), the memory 204 (and other memories described throughout this document) is an example of computer storage media and may include volatile and nonvolatile memory. Thus, the memory 204 may include, but is not limited to, RAM, ROM, EEPROM, flash memory, or other memory technology, or any other medium which can be used to store media items or applications and data which can be accessed by the eBook reader device 104(1).

The memory 204 may be used to store any number of functional components that are executable on the processing unit(s) 202, as well as data and content items that are rendered by the eBook reader device 104(1). Thus, the memory 204 may store an operating system and an eBook storage database to store one or more content items 206, such as eBooks, audio books, songs, videos, still images, and the like. The memory 204 may further include a memory portion designated as an immediate page memory to temporarily store one or more pages of an electronic book. The pages held by the immediate page memory are placed therein a short period before a next page request is expected.

The term "page," as used herein, refers to a collection of content that is presented at one time in a display of the eBook reader device 104(1). Thus, a "page" may be understood as a virtual frame of the content, or a visual display window presenting the content to the user. Thus, "pages" as described herein are not fixed permanently, in contrast to the pages of published "hard" books. Instead, pages described herein may be redefined or repaginated when, for example, the user chooses a different font for displaying the content in the first display. In addition to pages, the terms "page views", "screen views", and the like are also intended to mean a virtual frame of content.

An interface module 208 may also be provided in memory 204 and may be executed on the processing unit(s) 202 to provide for user operation of the device 104(1). One feature of the interface module 208 allows a user to request to receive information from a reference work regarding a word, phrase, or topic found within one of the content items 206. For instance, the interface module 208 may allow the user to request a definition of a word from a dictionary, synonyms from a thesaurus, a map from an atlas, and the like.

The interface module 208 may facilitate textual entry of request (e.g., via a cursor, controller, keyboard, etc.), audible entry of the request (e.g., via a microphone), or entry of the request in any other manner. The interface module 208 may provide menus and other navigational tools to facilitate selection and rendering of the content items 206. The interface module 208 may further include a browser or other application that facilitates access to sites over a network, such as websites or online merchants.

A content presentation application 210 renders the content items 206. The content presentation application 210 may be implemented as various applications depending upon the content items. For instance, the application 210 may be an electronic book reader application for rending electronic books, or an audio player for playing audio books or songs, or a video player for playing video, and so forth.

The memory 204 may also store user credentials 212. The credentials 212 may be device specific (set during manufacturing) or provided as part of a registration process for a service. The credentials may be used to ensure compliance with DRM aspects of rendering the content items 206.

The memory 204 also stores one or more reference works 214, such as one or more dictionaries, thesauruses, encyclopedias, atlases, gazetteers, and the like. In some instances, the memory 204 stores multiple categories of a particular kind of reference work. For instance, the memory 204 may store a standard dictionary (e.g., Merriam-Webster® English Dictionary), a medical dictionary, a legal dictionary, a science dictionary, a science-fiction dictionary, an engineering dictionary, a foreign language dictionary, a business dictionary, a chemistry dictionary, a mathematics dictionary, and the like. In other instances, a single kind of reference work may contain multiple reference work entry types. For instance, a single dictionary may store, for one or more of the words therein, a standard dictionary entry, a medical dictionary entry, a legal dictionary entry, a science dictionary entry, and the like.

FIG. 2 further illustrates that the memory 204 stores a feedback module 216 that is executable on the processing unit(s) to receive user feedback regarding an outputted reference work entry or a classified genre of a content item. As discussed above, this feedback may be used to help re-classify the genre associated with the content item.

The eBook reader device 104(1) also stores a reference entry selection module 218 that is executable on the processing unit(s) to select a particular type of reference work entry based on a genre of a content item, a characteristic of a user, or the like. For instance, this module 218 may store or reference a table that maps "content item genres" to "reference work entry types." Therefore, when the content presentation application 210 outputs a content item of a particular genre and the user requests some reference work information associated with a word, phrase, or topic therein, the module 218 may reference this table to determine the type of entry to output. In some instances, the reference entry selection module 218 may reside on the content item service 106 or in another location, in which case the eBook reader device 104(1) may access the module 218 over the network 108.

In the example of FIG. 1, the module 218 may determine that the application 210 should display a medical definition when receiving a request for a word within an eBook that has been categorized as "medical" in nature. This table may similarly map a "legal" genre to a "legal" reference work entry type, a "sci-fi" genre to a "science" reference work entry type, a "historical fiction," "British lit" and the like to a "standard" reference work entry type, and so on. In some instances, this table may map combinations of genres to reference work entry types. For instance, the table may map an eBook that is associated with both a "medical" genre and a "mystery" genre to a "standard" reference work entry type rather than a "medical" reference work entry type. It is to be appreciated, however, that FIG. 2 simply illustrates several example mappings, and that any type of content item genre may map to any type of reference work entry type in certain implementations.

FIG. 2 further illustrates that the eBook reader device 104(1) may include a display 220, which may be passive, emissive or any other form of display. In one implementation, the display uses electronic paper (ePaper) display technology, which is bi-stable, meaning that it is capable of holding text or other rendered images even when very little or no power is supplied to the display. Some example ePaper-like displays that may be used with the implementations described herein include bi-stable LCDs, MEMS, cholesteric, pigmented electrophoretic, and others. In other implementations, or for other types of devices, the display may be embodied using other technologies, such as LCDs and OLEDs, and may further include a touch screen interface. In some implementations, a touch sensitive mechanism may be included with the display to form a touch-screen display.

The eBook reader device 104(1) may further be equipped with various input/output (I/O) components 222. Such components may include various user interface controls (e.g., buttons, a joystick, a keyboard, etc.), audio speakers, connection ports, and so forth.

A network interface 224 supports both wired and wireless connection to various networks, such as cellular networks, radio, WiFi networks, short range networks (e.g., Bluetooth), IR, and so forth. The network interface 224 may allow a user of the device 104(1) to download content items from the content item service 106, may allow the feedback module 216 to provide received feedback to the service 106, and the like.

The eBook reader device 104(1) also includes a battery and power control unit 226. The battery and power control unit operatively controls an amount of power, or electrical energy, consumed by the eBook reader device. Actively controlling the amount of power consumed by the reader device may achieve more efficient use of electrical energy stored by the battery.

The eBook reader device 104(1) may have additional features or functionality. For example, the eBook reader device 104(1) may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data.

Various instructions, methods and techniques described herein may be considered in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

Example User Interfaces

FIGS. 3-6 illustrate example user interfaces that the eBook reader device 104(1) (and the other client devices of the architecture 100) may render in accordance with the techniques described above. While these figures illustrates a few example interfaces it is to be appreciated that numerous other types of interfaces displaying information from numerous other types of reference works may be implemented using the described techniques.

Figure 3:
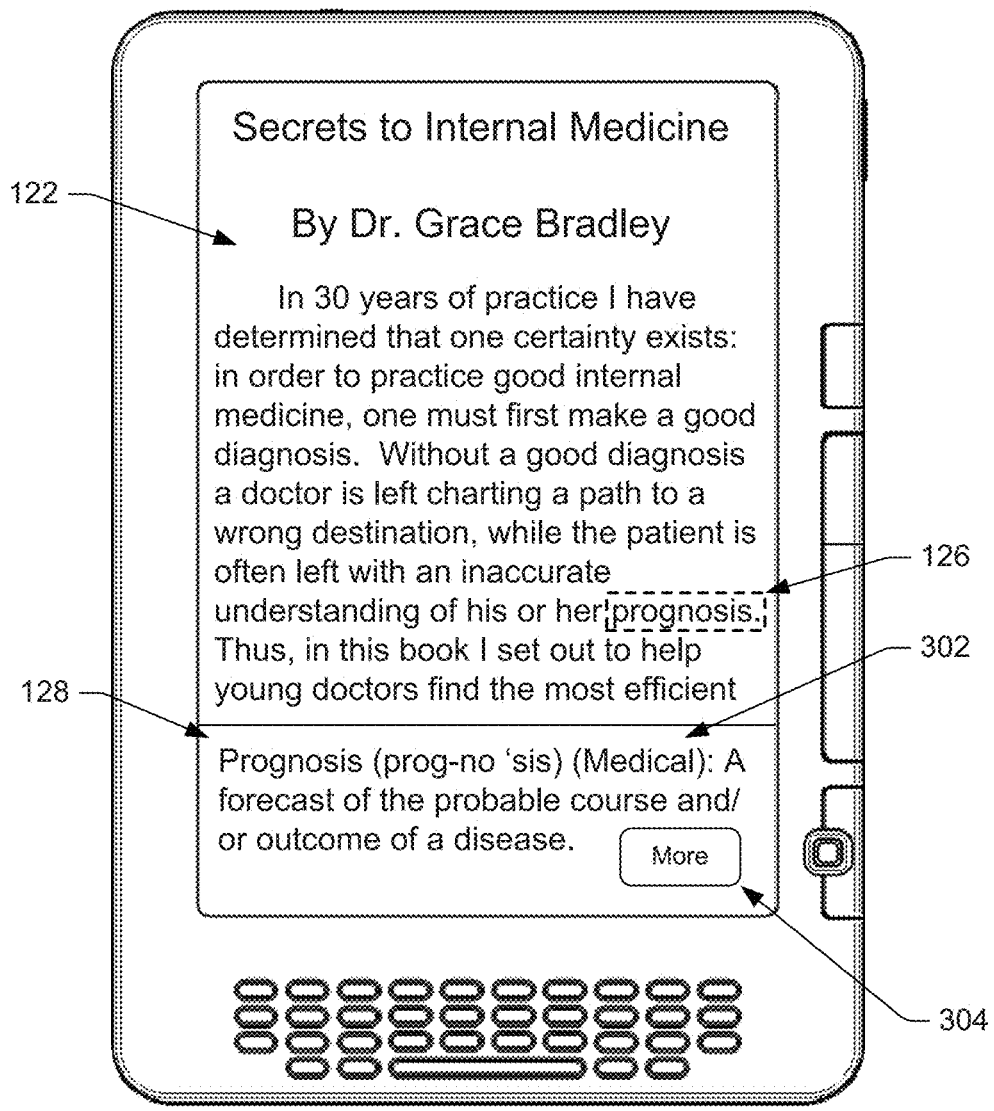
FIG. 3 illustrates an example user interface rendered by the devices of FIGS. 1 and 2. Here, the device or the content item service has determined that the eBook currently being read by the user is associated with a "medical" genre. As such, when the user requests a definition for a word within the eBook, the device displays a "medical" definition of the word rather than a standard or other type of definition.

FIG. 3 illustrates the example user interface described above with reference to FIG. 1. Here, the eBook reader device 104(1) or the content item service 106 has determined that the eBook 122 currently being read by the user is associated with a "medical" genre. As such, when the user requests a definition for a word within the eBook, the device displays a "medical" definition of the word rather than a standard or other type of definition.

Specifically, FIG. 3 illustrates that the user has selected (e.g., via a keyboard, cursor, touch screen, etc.) the word "prognosis," as illustrated by the highlight 126. While the user selects a word in this example, the user may select a phrase in other embodiments. In response to the selection, the device 104(1) displays the medical definition 128 of this word. As illustrated, this definition 128 includes an indication 302 that this definition is in fact the medical definition, rather than another type of definition (e.g., a standard definition, a science definition, etc.).

In this example, the eBook reader device 104(1) may display a definition from a dictionary when the user selects a word, although in other implementations the device may display synonyms from a thesaurus, information from an encyclopedia, or information any other reference work type. In still other implementations, the device 104(1) may prompt the user to select the type of the reference work from which the device should display information.

FIG. 3 also illustrates that the definition 128 includes an icon 304 ("More") that, when selected, allows the user to view additional definitions of the word "prognosis."

Figure 4:
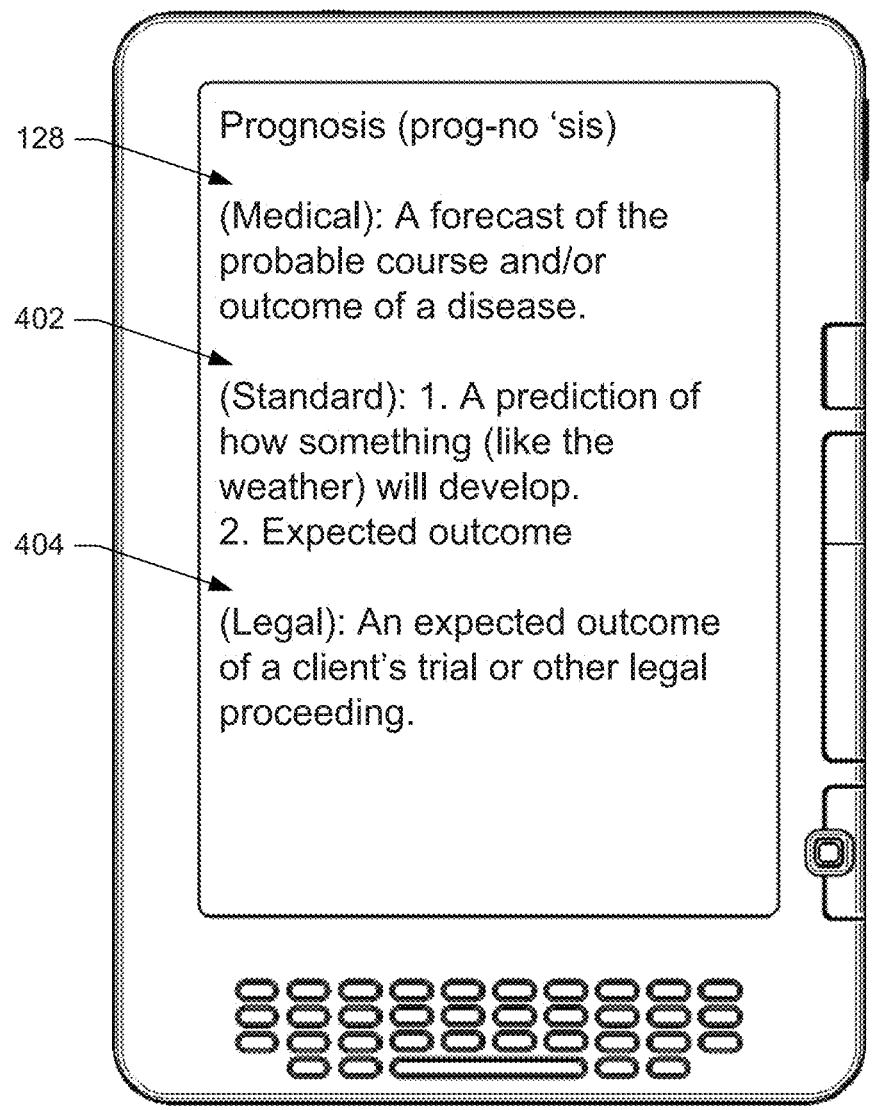
FIG. 4 illustrates an example user interface rendered by the device of FIG. 3 after the user has selected to view "more" definitions of the illustrated word "prognosis." As shown, in response the device displays definitions of "prognosis" in the medical sense, the standard sense, and the legal sense.

FIG. 4 illustrates an example user interface rendered by the eBook reader device 104(1) after the user has selected to view "more" definitions of the word "prognosis." As shown, in response the device displays the definition 128 of this word in the medical sense first, followed by a definition 402 of the word in a standard sense, and a definition 404 of the word in a legal sense. Here, the order of the list is also based on the genre of the eBook, with the medical definition appearing first. In some instances, one or both of the feedback modules 118 and 216 may use the user's selection of the icon 304 as an indication that the eBook or the currently displayed portion of the eBook may need to be re-classified. For instance and as discussed above, this selection may alter the confidence level associated with the currently associated genre.

Figure 5:
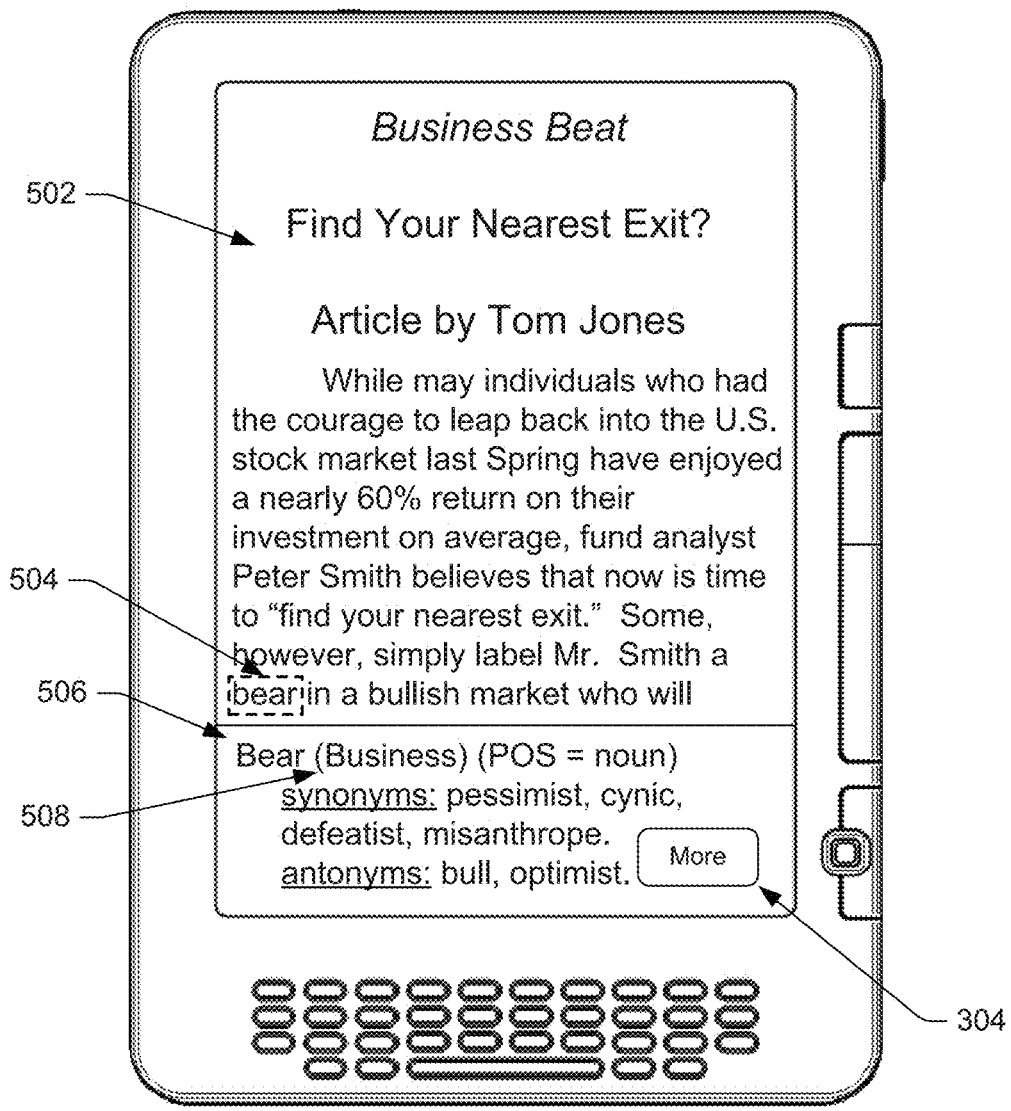
FIG. 5 illustrates another example user interface rendered by the devices of FIGS. 1 and 2. Here, the device is displaying an article from a periodical relating to "business." As such, when the user requests to look up in a thesaurus a word within the article, the device displays synonyms and antonyms from a business-related thesaurus entry.

FIG. 5 illustrates another example user interface rendered by the eBook reader device 104(1). Here, the device currently displays an eBook 502 comprising a periodical article that has been determined to relate the genre "business." As such, when the user requests information from a reference work regarding a word, phrase, or topic from the eBook 502, the device may display a reference work entry associated with the genre "business."

Here, for instance, the user requests (either explicitly or via default settings) to look up the word "bear" in a thesaurus, as indicated by a highlight 504. In response, the eBook reader device 104(1) displays an entry 506 from a thesaurus, the entry comprising synonyms and antonyms. As illustrated, an indication 508 indicates that this entry corresponds to a "business" use of the term "bear," as the synonyms include "pessimist, cynic, defeatist, misanthrope," while the antonyms include "bull, optimist." This is contrasted with the standard use of the term "bear" in the English language, having synonyms of bear "stand, stomach, tolerate, abide" and the like. However, by displaying a business-related thesaurus entry when the user reads a business-related eBook, the device 104(1) is more likely to provide the user with the information that she seeks. Furthermore, the device 104(1) also displays the "more" icon 304 to allow the user to view other thesaurus entry types associated with the word "bear" (e.g., the standard use entry, an entry related to animals, etc.).

Figure 6:
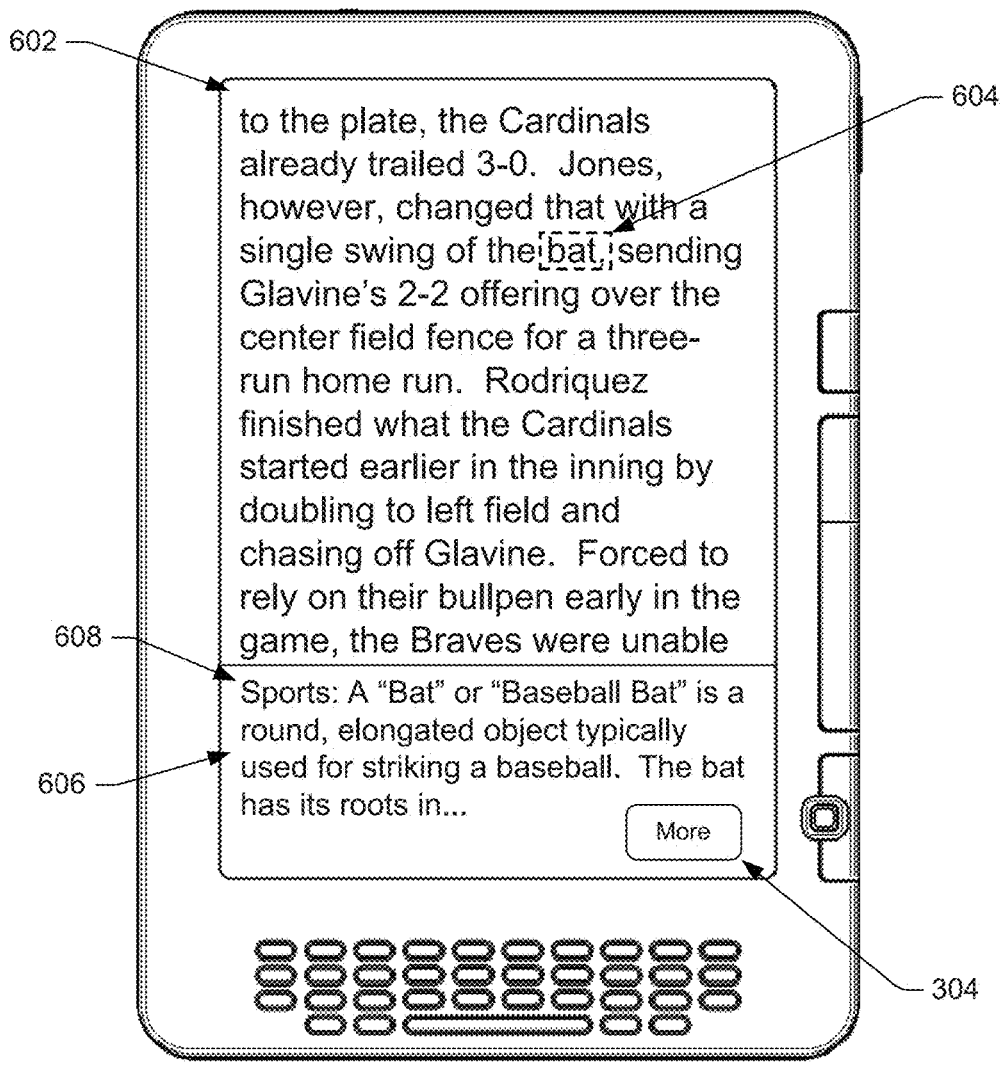
FIG. 6 illustrates another example user interface rendered by the devices of FIGS. 1 and 2. Here, the device is displaying a sports-related article. As such, when the user requests to look up in an encyclopedia a topic within the article, the device displays information about that topic from a sports-related encyclopedia entry.

FIG. 6 illustrates another example user interface rendered by the eBook device 104(1). Here, the device 104(1) is displaying an eBook 602 in the form of an article that has been determined be associated with a "sports" genre. Here, the user requests to look up the topic "bat" in an encyclopedia, as indicated by a highlight 604. In response, the device 104(1) displays an entry 606 from a sports-related encyclopedia that explains the history and importance of a "baseball bat." The eBook device 104(1) also displays an indication 608 that the entry 606 resides in a sports-related encyclopedia, or that the entry is sports-related entry in a general encyclopedia.

Again, the device also displays the "more" icon that, when selected, causes the device to display other articles associated with the term "bat," such as an article about the nocturnal mammal In instances where the currently displayed eBook 602 has user been classified as related to an "animal" genre, the device 104(1) may instead display the animal-related encyclopedia entry first, rather than the illustrated sports-related entry 606.

Example Process

Figure 7:
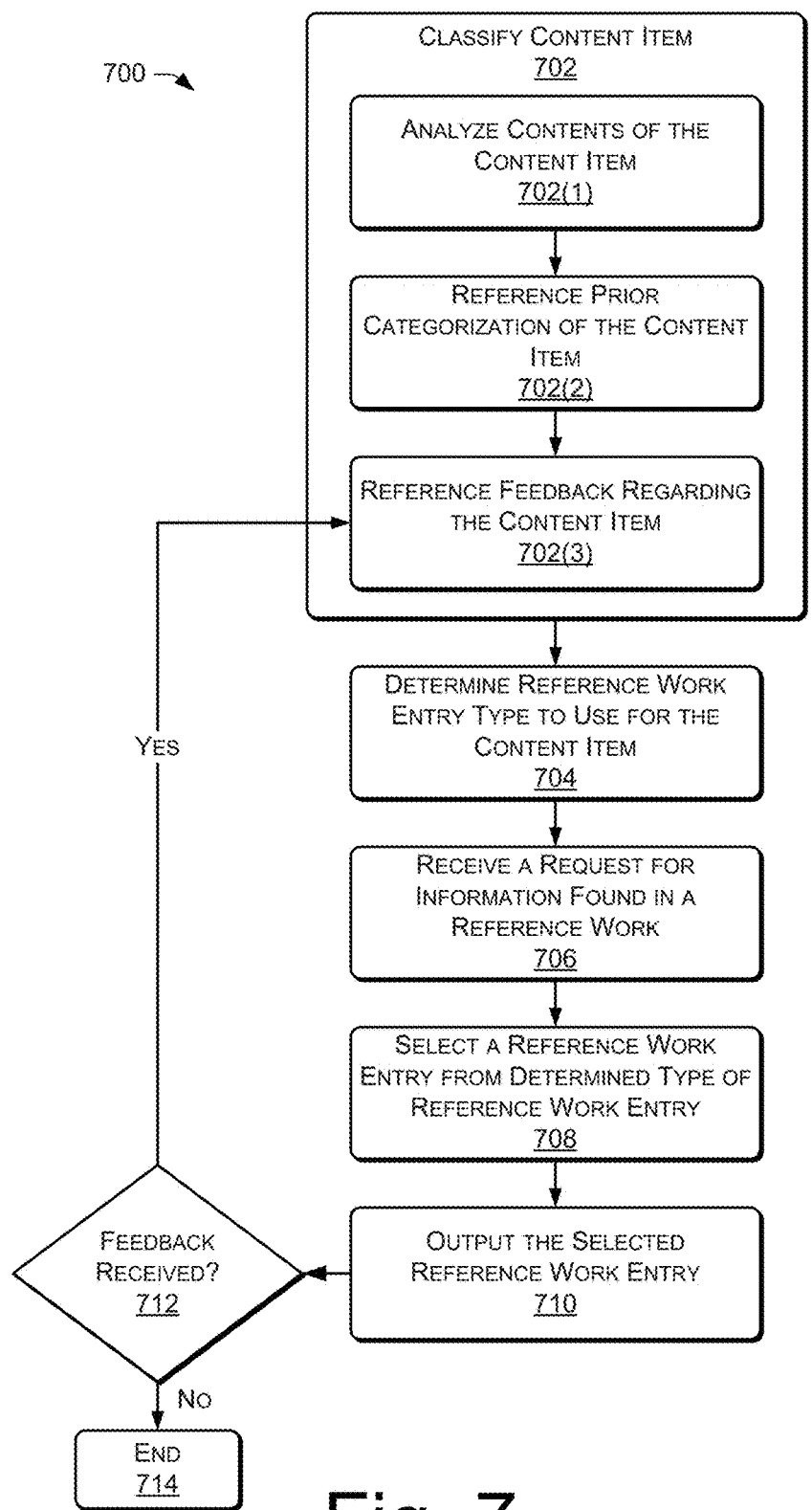
FIG. 7 is a flow diagram showing a process of classifying a content item according to, for example, a genre and determining, based on the classification, a type of reference work entry to use for the content item when a user requests information associated with a word, phrase, or topic found within the content item.

FIG. 7 illustrates an example process 700 for implementing the techniques described above of providing context-sensitive reference work entries. This process is illustrated as a logical flow graph, each operation of which represents a sequence of operations that can be implemented in hardware, software, or a combination thereof. In the context of software, the operations represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

For discussion purposes, the process 700 is described with reference to the architecture 100 of FIG. 1, although other architectures may implement this process.

Process 700 includes an operation 702, which represents classifying a content item as belonging to one or more genres, such as one or more of the genres discussed above. This analyzing may include one or a combination of sub-operations 702(1), 702(2), and 702(3). Classifying a content item may include, for instance, analyzing contents of the content item at sub-operation 702(1). This may include analyzing a content item for key words and comparing these key words to sets of key words associated with different respective genres. Sub-operation 702(2), meanwhile, may include referencing a prior categorization of the content item, such as from an electronic catalog of content items. Finally, sub-operation 702(3) may include referencing feedback regarding the content item itself, as discussed above.

After classifying the item, an operation 704 represents determining a reference work entry to use for the content item based at least in part on the classified genre of the item. For instance, if the item has been classified as "legal," operation 704 may determine that a "legal" reference work entry should be used. Conversely, if the reference work is classified as "thriller," then operation 704 may determine that a "standard" reference work entry should be used.

Next, an operation 706 represents receiving a request for information found within a reference work regarding a word, phrase, or topic found within the content item. This may include, for example, receiving a request for a definition of a word from a dictionary, synonyms or antonyms for the word from a thesaurus, information regarding a topic from an encyclopedia, a map from an atlas, or the like.

Operation 708, meanwhile, represents selecting a reference work entry from the determined type of reference work entry type. For instance, after the user requests to receive a definition of the word "prognosis" found within a medical-related book, operation 708 may select the medical definition of "prognosis." Next, an operation 710 represents outputting (visually, audibly, etc.) the selected reference work entry, such as the medical definition of the term "prognosis." Again, this outputting may comprise outputting multiple definitions of the word in an order based at least in part on the classified genre(s) of the content item. For instance, operation 710 may output multiple definitions of the word "prognosis," with the medical definition being displayed first or more prominently in the list relative to the other definitions.

Operation 712 represents querying whether feedback (e.g., user feedback) has been received in response to the output of the reference work entry. For instance, operation 712 may query whether the user decided to view additional definitions of the word "prognosis." If so, then this feedback is fed back to the classification block to potentially alter the classification of the content item. If no feedback is received, then the process 700 ends at operation 714.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
under control of one or more computer systems configured with specific executable instructions,
determining a genre of an electronic book based at least in part on a prior categorization of the electronic book, the prior categorization having previously classified the contents of the electronic book;
receiving, on an electronic book reader device displaying the electronic book, a request for a definition of a word found within contents of the electronic book;
selecting, based at least in part on the determined genre of the electronic book, a dictionary entry from multiple different dictionary entries each providing a definition of the word;
locating the definition of the word from the selected dictionary entry;
displaying the definition of the word from the selected dictionary entry on the electronic book reader device at least partly in response to the receiving of the request
receiving feedback regarding the determined genre or the selected dictionary entry; and
determining a different genre of the electronic book based at least in part on the received feedback.

2. A method as recited in claim 1, wherein the determined genre of the electronic book comprises a genre related to science, science fiction, medicine, business, law, or a foreign language.

3. A method as recited in claim 1, wherein the selected dictionary entry is a science dictionary entry, a science-fiction dictionary entry, a medical dictionary entry, a business dictionary entry, a legal dictionary entry, a native-language dictionary entry, or a non-native-language dictionary entry.

4. A method as recited in claim 1, wherein the multiple different dictionary entries providing a definition for the word reside in a single dictionary, in different respective dictionaries, or in a combination thereof.

5. A method as recited in claim 1, wherein the determining of the genre is further based at least in part on analyzing the contents of the electronic book, and wherein the analyzing of the contents of the electronic book comprises:
identifying key words within the electronic book; and
comparing the identified key words to sets of key words associated with different respective genres.

6. A method as recited in claim 1, wherein the genre is further determined based at least in part on previously received user feedback regarding the genre of the electronic book.

7. A method as recited in claim 1, wherein the genre is further determined based at least in part on an identity of a user associated with the electronic book reader device that displays the electronic book.

8. A method as recited in claim 1, wherein the determining of the genre of the electronic book comprises determining the genre of the electronic book as a whole or determining the genre of a portion that is less than the entire electronic book.

9. A method as recited in claim 1, wherein the displaying comprises displaying the selected dictionary entry and at least one other of the multiple different dictionary entries for the word, the selected dictionary entry being displayed more prominently than the at least one other dictionary entry.

10. A method as recited in claim 1, wherein the determining comprises determining at least two genres of the electronic book, and wherein the selected dictionary entry is based at least in part on each of the at least two determined genres.

11. A method as recited in claim 1, wherein the determined genre comprises a genre of a first portion of the electronic book, and further comprising:
determining a different genre of a second, different portion of the electronic book;
receiving, on the electronic book reader device displaying the electronic book, a request for a definition of a word found within the second portion of the electronic book;
selecting, based at least in part on the determined genre of the second portion of the electronic book, a dictionary entry from multiple different dictionary entries each providing a definition of the word found within the second portion;
locating the definition of the word found within the second portion from the selected dictionary entry; and
displaying the definition of the word found within the second portion from the selected dictionary entry on the electronic book reader device at least partly in response to the receiving of the request.

12. A method as recited in claim 1, wherein displaying further comprises concurrently displaying the definition of the word from the selected dictionary entry with the contents of the electronic book containing the requested word.

13. One or more non-transitory computer-readable media storing computer-executable instructions that, when executed, cause one or more processors to perform acts comprising:
identifying a genre of a content item being output by an electronic device based at least in part on an identity of a user associated with the electronic device, wherein the identity of the user is determined based at least in part on at least one of:
a location of the electronic device; or
demographic information of the user;
receiving a request for information associated with a portion of the content item;
selecting, based at least in part on the identified genre of the content item, a reference work entry from multiple different reference work entries each providing information pertinent to the request; and
outputting the requested information from the selected reference work entry.

14. One or more non-transitory computer-readable media as recited in claim 13, wherein the content item comprises audio, video, or text.

15. One or more non-transitory computer-readable media as recited in claim 13, wherein each reference work entry resides within a dictionary, a thesaurus, an almanac, an atlas, an encyclopedia, or a gazetteer.

16. One or more non-transitory computer-readable media as recited in claim 13, wherein the requested information comprises a definition of a word, a synonym for a word, an antonym for a word, more information for a particular topic, or a map for a particular location.

17. One or more non-transitory computer-readable media as recited in claim 13, wherein the identifying of the genre further comprises analyzing contents of the content item to identify the genre, referencing a prior categorization of the content item to identify the genre, or asking for user input regarding the genre of the content item.

18. One or more non-transitory computer-readable media storing computer-executable instructions that, when executed, cause one or more processors to perform acts comprising:
classifying at least a portion of an electronic book as belonging to a genre of multiple different genres, wherein the classifying comprises referencing prior feedback regarding previous user responses to queries about the genre of the at least a portion of the electronic book or of the electronic book as a whole; and
determining, based at least in part on the classified genre, at least one category of dictionary entry to use when receiving a request for a definition of a word found within the electronic book.

19. One or more non-transitory computer-readable media as recited in claim 18, wherein the classifying further comprises analyzing contents of the at least a portion of the electronic book.

20. One or more non-transitory computer-readable media as recited in claim 19, wherein the analyzing of the contents comprises:
identifying key words residing within the at least a portion of the electronic book; and
comparing the identified key words to key words associated with each of the multiple different genres.

21. One or more non-transitory computer-readable media as recited in claim 18, wherein the classifying further comprises referencing a prior categorization of the at least a portion of the electronic book or of the electronic book as a whole.

22. One or more non-transitory computer-readable media as recited in claim 18, wherein the genre of the at least a portion of the electronic book comprises a genre related to science, science fiction, medicine, business, law, or a foreign language.

23. One or more non-transitory computer-readable media as recited in claim 18, wherein the determined at least one category of dictionary entry is a science dictionary entry, a science-fiction dictionary entry, a medical dictionary entry, a business dictionary entry, a legal dictionary entry, a native-language dictionary entry, or a non-native-language dictionary entry.

* * * * *